Dec. 12, 1950     A. RICCIARDI     2,534,059
CONFECTION MOLD
Filed Dec. 24, 1946
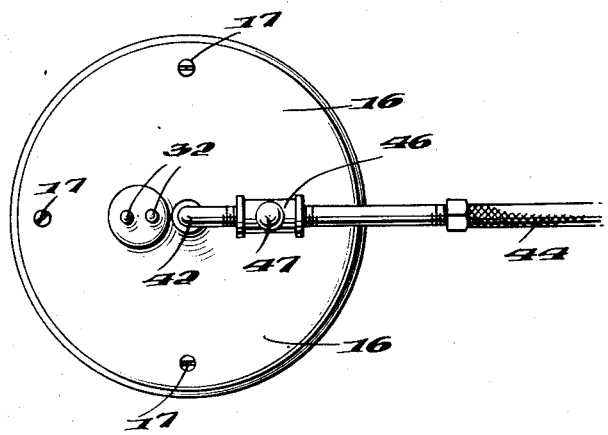
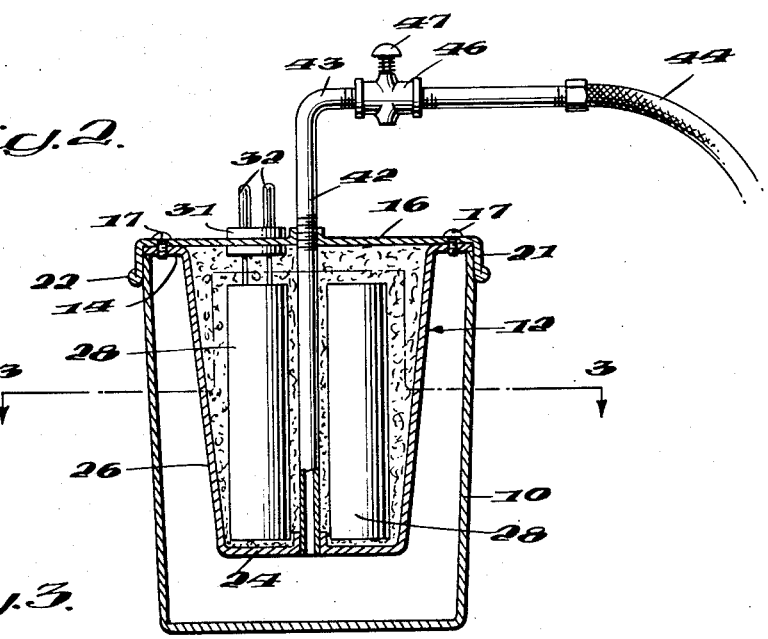
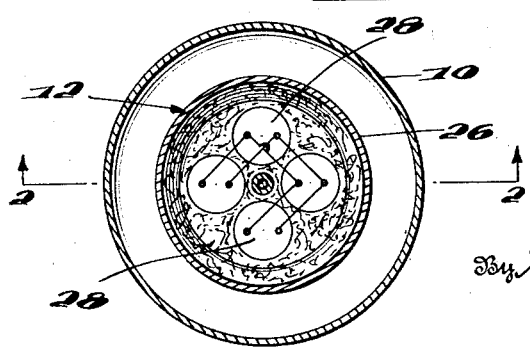
Inventor
ATTILIO RICCIARDI,
By Henninger and Pillars
Attorney Patented Dec. 12, 1950

2,534,059

UNITED STATES PATENT OFFICE 2,534,059

CONFECTION MOLD

Attilio Ricciardi, New York, N. Y.

Application December 24, 1946, Serial No. 718,134

5 Claims. (Cl. 107—19)

The present invention relates to confection making and pertains to a die adapted for use in forming cup-shaped molded confections such as ice cream.

The invention pertains to a die having particular utility for molding ice cream or the like to provide a cavity therein which may then be filled with various ingredients such as whipped cream or whipped cream mixed with fruit or nuts thereby providing a confection known as spumone. In the past the ice cream shell for making spumone has been made by hand and a quantity of relatively soft ice cream is first placed in a mold. The ice cream is then manually spread with the fingers as evenly as possible on the side wall of a mold. The whipped cream including any ingredients that may be desired are then added to the cavity formed in the ice cream shell. The cover is then placed over the mold and the ice cream is hardened by freezing. Thereafter the frozen confection is removed from the mold by supplying heat to the exterior thereof such as dipping the mold in warm water.

In the manual method of spreading the ice cream along the inner wall of the mold, the fingers of an individual's hand are chilled and the ice cream then clings to the fingers. When this occurs, it is necessary for the molder to dip his fingers in warm water in order to continue the manual spreading of the ice cream along the wall of the mold to provide the cavity in the ice cream shell.

It is an object of the present invention to provide a die for molding ice cream in a cup-shaped shell in a more sanitary manner without the necessity of the operator's hands coming in contact with the ice cream or the like during the molding operation.

A further object of the invention is to provide a die for use in molding a confection material into cup-shaped shells so as to form one element of a spumone confection without interrupting the molding operation to remove ice cream from adhering to the surface of the die.

A still further object of the invention is to provide a die for molding ice cream or a frozen confection including means for imparting heat to the surface of the die to prevent the cooling of the surface thereof to a point where the frozen confection would adhere to the surface and interfere with the removal of the die from the ice cream.

A still further object of the invention is to provide a die for molding ice cream in a cup-shaped mold including in combination means for heating the die and means for introducing air into the mold cavity at the lower end of the die so as to increase the air pressure therein and facilitate the removal of the die from the molded body.

Other features and objects of the invention will be more apparent as the present disclosure proceeds and upon consideration of the accompanying drawing and the following detailed description wherein an exemplary embodiment of the invention is disclosed.

In the drawing:

Fig. 1 is a plan view of a die embodying the invention;

Fig. 2 is a sectional view of the die and a mold associated therewith taken on the line 2—2 of Fig. 3; and Fig. 3 is a sectional view taken on the line 3—3 of Fig. 2.

The present invention is directed to the manufacture of molded frozen confections and pertains to a die having utility in the making of spumone. A spumone confection includes a cup-shaped shell of ice cream or similar solidified edible confection with the cavity filled with a mixture of whipped cream or whipped cream and nuts or fruit. The die forming the subject-matter of the present invention is for the purpose of creating the cavity in the cup-shaped shell of ice cream or the like when used in combination with a mold to impart the desired shape to the exterior of the shell. The die includes means for heating the surface thereof to prevent ice cream or other confections from adhering thereto during repeated molding operations. The die also includes means for admitting air to the cavity while the die is in place so as to promote the removal of the die without disturbing the molded contour of the cavity.

A prior practice in the molding of ice cream to form a spumone confection includes the introduction of a measured quantity of ice cream into a mold such as represented at 10 in the drawing and the spreading of the ice cream along the inner wall of the mold by the fingers of an operator. Such a method is objectionable from a hygienic standpoint and does not produce a uniform wall thickness. The mold may be of any suitable shape and the inner wall surface thereof is preferably frusto-conical shaped to facilitate the withdrawal of the molded edible material from the mold.

The present invention pertains to a die for co-operation with a mold such as shown at 10 so as to properly shape the ice cream therein to produce a cup-shaped shell of ice cream or the like each having a wall of substantially uniform thickness. The die includes a hollow depending body member 12 which forms the molding surfaces and may therefore be made of metal such as stainless steel or the like. The body member 12 is smaller in diameter at its lower end and the exterior surface is frusto-conical shaped to facilitate the withdrawal of the die from the molded material. The upper end of the peripheral wall 26 is bent outwardly to form an annular flange 14 at the top of the die body. The hollow body member is provided with a cover 16 which may be formed of sheet metal such as stainless steel. The cover 16 is substantially disc shaped and is detachably secured to the cup-shaped body member 12 by any suitable means such as a plurality of screws 17 which extend through the cover 16 and are threaded in openings in the annular flange 14. The periphery of the cover 16 carries a depending skirt 21 and which may be formed integral with the disc-shaped top member. The skirt 21 preferably terminates in a partially rolled edge 22 as shown in Fig. 2. The internal diameter of the skirt 21 is such as to fit over the upper end of the mold 10 and thereby provide for the centering of the die in the mold. The top edge of the mold 10 also provides an abutment limiting the downward movement of the die body and thereby provides for a uniform molding of the bottom portion of the cup-shaped confection shell.

In the molding of frozen confection a measured quantity of the confection is introduced into the mold 10. Thereafter the die is introduced into the mold and the depending body member 12 will be centered in the mold and limited in its introduction by the cooperation of the annular peripheral portion of the die with the upper end of the mold 10. The plastic confection material will thereby be uniformly distributed around the inner wall of the mold 10 and a cavity of inverted frusto-conical shape will be formed therein. Thereafter the die may be removed and the whipped cream or other ingredients introduced into the cavity for further solidification or freezing.

Repeated use of the die will cause the surface thereof to be chilled whereby ice cream or the like will tend to adhere to the bottom surface 24 and the periphery 26. It is for this purpose that the die is heated to permit continued use of the implement without the necessity of a delay in permitting the die to return to room temperature after a series of molding operations. In the embodiment illustrated in the drawing, the heating means includes a plurality of heater elements 28 arranged within the hollow die body. These heater elements may be of the cartridge type wherein the resistance elements are completely enclosed in a sealed sheath. In one embodiment four such heaters may be arranged within the hollow body 12 suitably connected so that all of the heater elements may be energized through an electric connection illustrated at 31. The heaters may be supplied with electrical energy through a flexible cord having a female plug for connection with the prongs 32 which form part of the connection 31. The heater elements 28 may be so designed as to maintain the die heated at such a temperature as to prevent the adherence of the confection thereto without materially melting ice cream or the like. If desired, an adjustable resistance (not shown) may be included in the circuit supplying the heater elements. In order to provide an even distribution of heat from the elements 28 to the peripheral wall 26 and the bottom wall 24, the space within the die may be filled with metal shavings such as copper, aluminum, or steel wool. The electrical conductors may be suitably insulated from the terminals of the heater element to a point where they are connected to the prongs 32.

The introduction of the die into the plastic confection in carrying out a molding operation necessarily excludes some of the air from the mold and there is a tendency for a vacuum condition to be created when the die is removed from the cavity in the molded ice cream or the like. Such a low pressure condition interferes with the removal of the die body and disturbs the molded condition of the plastic confection. It is for the purpose of avoiding such disadvantages that the invention includes means for introducing air under pressure into the mold and preferably at the lower end of the die. The device accordingly includes a conduit or pipe 42 extending downwardly through the die body and terminating at the lower end thereof. The pipe 42 may be threaded through the cover 16 and threaded or otherwise joined to the bottom wall 24 so as to provide impervious connections at these points.

The pipe 42 may also be shaped to provide a handle for manipulating the die. In the embodiment shown the pipe is bent to form a horizontal portion 43 and this pipe is connected to a flexible tube or hose 44 leading from a supply of compressed air. The air supply pipe includes a valve 46 which is normally closed and which may be opened by depressing the button 47. Accordingly, the valve manipulating button 47 is positioned to be operated by the thumb or fingers when the horizontal part 43 of the pipe is employed as a handle. Thus after the plastic confection has been properly molded by the die, this device may be removed without disturbing the molded surface of the cavity by depressing the button 47 to admit air through the pipe 42 into the mold at the lower end of the die to remove any vacuum condition existing therein. Accordingly, the die body may be removed without disturbing the smooth molded surface of the ice cream or the like.

While the invention has been described with reference to specific structural details in regard to the features of the die, it will be appreciated that changes may be made in the various elements without departing from the spirit and scope of the invention which pertains to a combination of the elements providing a die adapted to the molding of cup-shaped ice cream shells or the like.

I claim:

1. A confection die adapted to cooperate with a mold comprising, a frusto-conical shaped hollow die body having the end of less diameter closed and the opposite end thereof open, a cover for the open end of said die body, means carried by the cover for centering the die in a mold, means within the die body for heating the die, and means for introducing a fluid medium under pressure into said mold through the closed end of the die body.

2. A confection die for use with a mold comprising, a frusto-conical shaped hollow die body having the end of less diameter closed and the opposite end thereof open, a cover for the open end of said die body, a depending skirt carried by said cover for engaging the mold and centering the die in the mold, an electrical heater within the die body, means for conducting heat from said heater to the die body, and means extending through the closed end for introducing a fluid medium under pressure into said mold through the die.

3. A confection die adapted to cooperate with a mold comprising, a frusto-conical shaped hollow die body having the end of less diameter closed and the opposite end thereof open, a cover for the open end of said die body, means carried by the cover for centering the die body in a mold, means within the die body for heating the die, and a pipe forming a handle for the die extending through said cover and through the said closed end of the die body for supplying compressed air externally of the closed end of the die.

4. A confection die adapted to cooperate with a mold comprising, a hollow die body having an open and a closed end, a cover for the open end of said die body, means carried by the cover for centering the die in said mold, heater means within the die body, metal particles within the die body for conducting heat from the heater means to the die body, and a pipe for supplying compressed air into said mold through the closed end of the die.

5. A die for use in molding cup-shaped plastic confection materials in a mold comprising, a hollow die body having a closed and an open end, a cover for the open end of said die body, an annular skirt carried by the cover for engaging a mold and centering the die body therein, heater means within said die body, and means within the die body for conducting heat from the heater means to the outer wall of the die body, a conduit forming a handle for the die, a normally closed valve within the handle portion of the conduit, and a pipe extending from the conduit through the hollow die body and the lower end thereof for supplying compressed air into said mold through the closed end of the die.

ATTILIO RICCIARDI.

REFERENCES CITED

The following references are of record in the file of this patent:

UNITED STATES PATENTS

| Number | Name | Date |
| --- | --- | --- |
| 875,567 | Bonshire et al. | Dec. 31, 1907 |
| 898,478 | Jackson | Sept. 15, 1908 |
| 1,465,724 | Barnes | Aug. 21, 1923 |
| 1,717,996 | Moore, Jr. | June 18, 1929 |
| 1,719,931 | Hall | July 9, 1929 |
| 1,891,230 | Harnden | Dec. 20, 1932 |
| 1,893,513 | Balian | Jan. 10, 1933 |
| 1,992,135 | Underwood | Feb. 19, 1935 |
| 2,007,572 | Jancsy | July 9, 1935 |
| 2,331,000 | Shaefer | Oct. 5, 1943 |